April 25, 1939.     E. B. WILFORD ET AL     2,155,881
AIRCRAFT
Original Filed April 18, 1935    2 Sheets-Sheet 1

INVENTORS
EDWARD BURKE WILFORD
ADOLPH HERZOG
BY
ATTORNEYS.

April 25, 1939. E. B. WILFORD ET AL 2,155,881
AIRCRAFT
Original Filed April 18, 1935 2 Sheets-Sheet 2

INVENTORS
EDWARD BURKE WILFORD
ADOLPH HERZOG
BY Frank H. Borden
ATTORNEYS.

Patented Apr. 25, 1939

2,155,881

UNITED STATES PATENT OFFICE 2,155,881

AIRCRAFT

Edward Burke Wilford, Merion, and Adolph Herzog, Penn Valley, Pa.; said Herzog assignor to said Wilford Application April 18, 1935, Serial No. 16,998
Renewed September 17, 1938

1 Claim. (Cl. 244—18)

This invention relates to aircraft and particularly aircraft of the rotary wing system type.

It is among the objects of the invention; to provide a unitary pylon and cabin; to provide in aircraft a rigid supporting structure and pylon, with the supporting structure also forming the frame members for a cabin; to provide improvements in landing gears for rotary wing aircraft; to provide improvements in weight distribution so that the center of gravity has a supporting wheel under it; to provide improved fuel tank dispositions for aircraft of the rotary wing system type so that the fuel mass is disposed close to the center of gravity of the aircraft; to provide a cabin type rotary wing system aircraft without any fixed wing system; to improve aircraft generally; to improve control for aircraft of the feathering rotary wing type; and many other objects and advantages as will become more apparent as the description proceeds.

Figure 1:
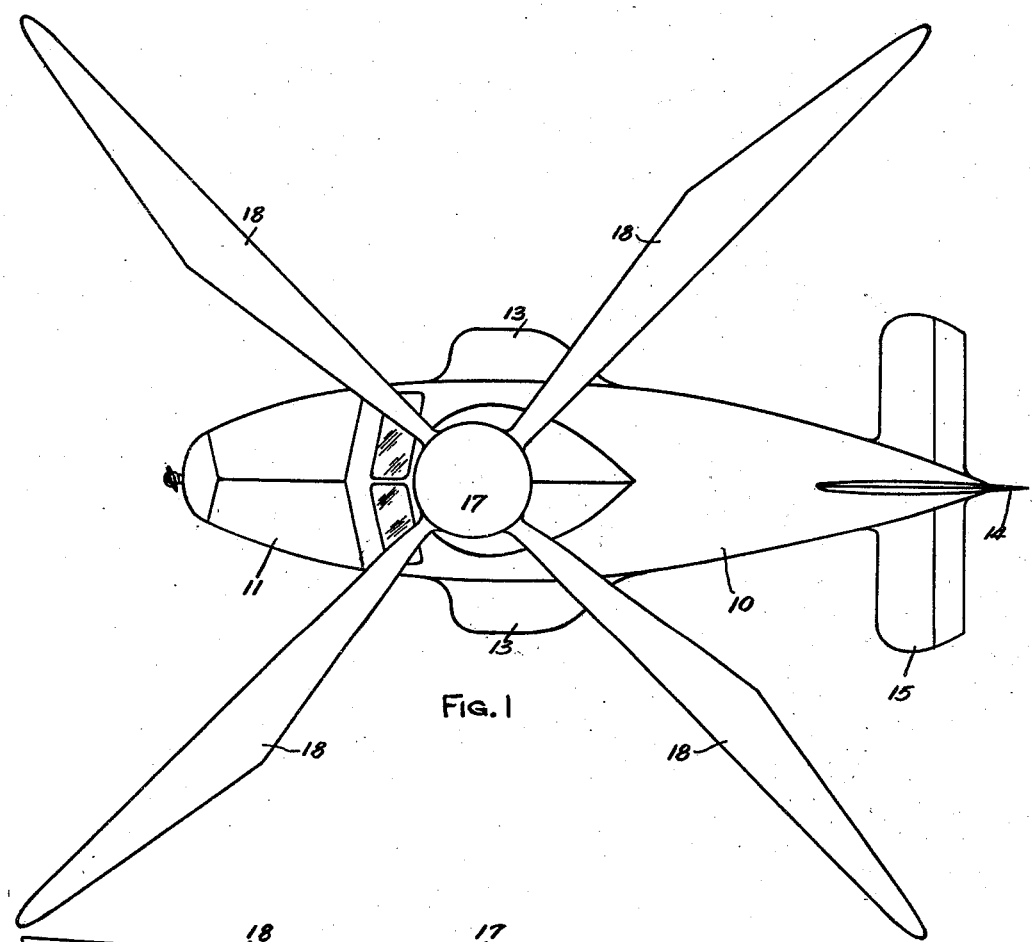
Figure 2:
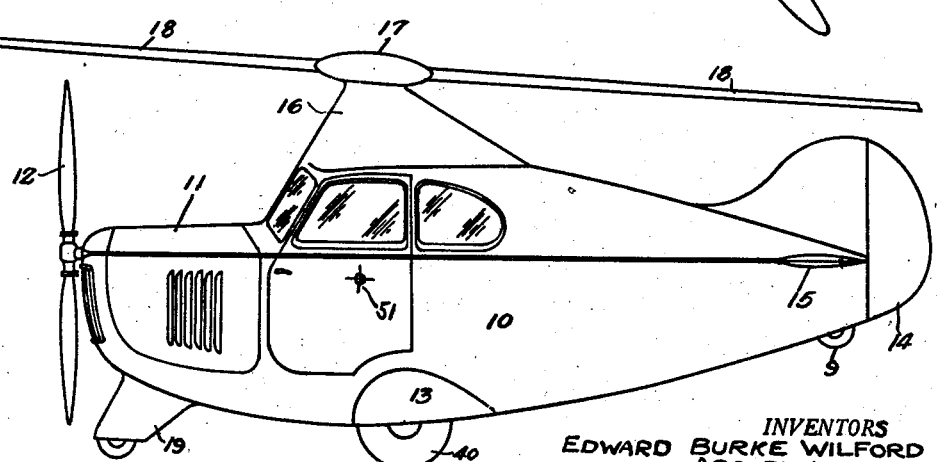
Figure 8:
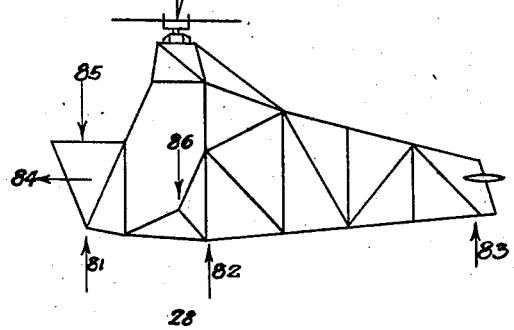
Figure 3:
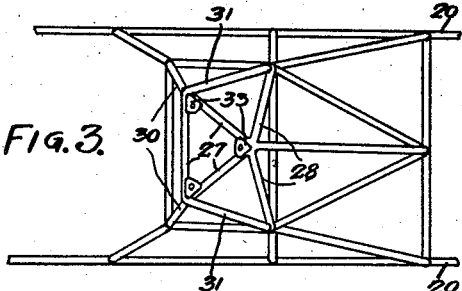
Figure 5:
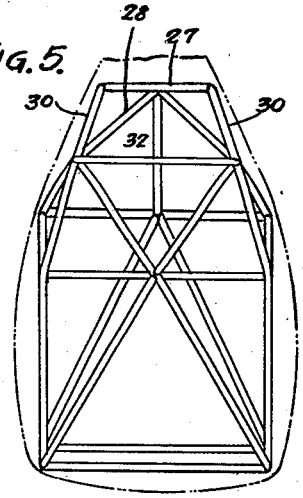
Figure 4:
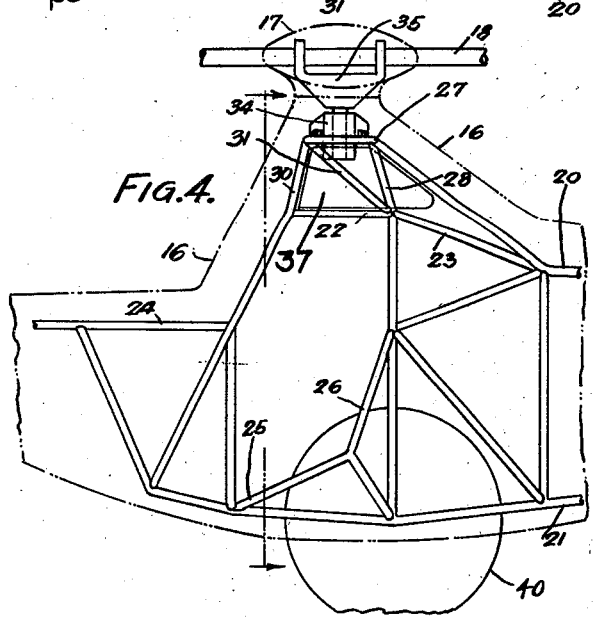
Figure 6:
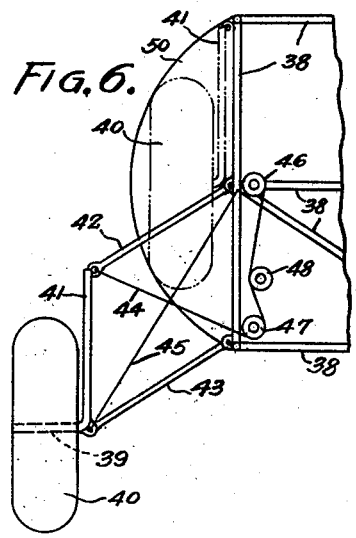
Figure 7:
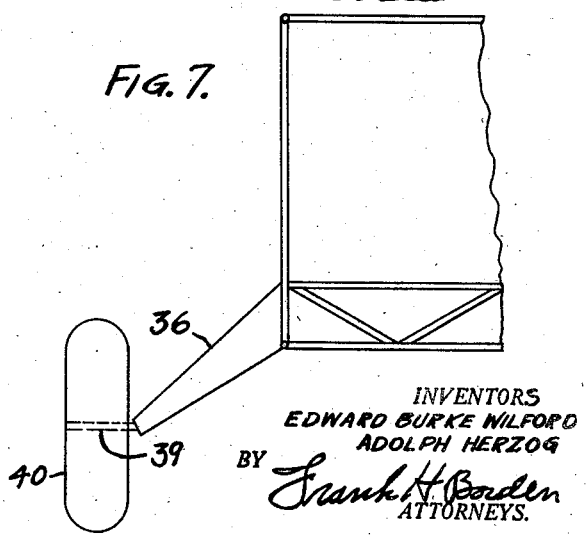

The attainment of these and other objects will be readily understood by reference to the drawings of which Fig. 1 is a top view of an aircraft which embodies this invention, Fig. 2 is a side elevation of the aircraft shown in Fig. 1, Fig. 3 is a top view of the skeleton structure of the body, Fig. 4 is a side elevation of the skeleton structure of the body, Fig. 5 is a front elevation of a skeleton structure of the body, Fig. 6 is a fragmental front view of a retractable landing gear, Fig. 7 is a fragmental front view of a cantilever landing gear, and Fig. 8 is a diagram indicating location of principal loads on the structure.

Referring to Figs. 1 and 2, the body 10 provides room for the passengers and other useful load, and on its main structure are mounted the engine located under cover 11, with its propeller 12, the landing gear wheels 40 under covers 13, the tail surfaces consisting of rudder 14 and stabilizer and elevator 15. In the conventional forms of rotary wing aircraft the rotor is mounted on a pylon or structure erected for the purpose, but in this invention there is no pylon but in place of it the structure of the cabin top is so arranged that the rotor hub is attached directly to it. This cabin is indicated by 16 mounting the rotary wing system comprised of the rotor hub inside cowling 17 and blades 18.

The position of the center of gravity of the aircraft is indicated by the circle 51 in Fig. 2 and the position of the rotor and landing gear with regard to this point is an important part of this disclosure. The rotor axis is slightly behind the center of gravity because of the rearward slope of the resultant thrust vector at certain attitudes. The main landing gear comprised of wheels 40 is also a little further behind the center of gravity and the front wheel 19 is provided for taxiing on the ground. However, the wheels 40 are not so far behind the center of gravity, but that in a takeoff the control in the rotor is powerful enough to rock the craft back on its wheels 40 to a position where tail wheel 9 is on the ground, thus giving the rotor sufficient angle of incidence to take the ship off at low speeds.

The aircraft shown is a small plane for two people, sitting side by side. It has no fixed wing, and this feature makes the whole structure low and easily accessible, light and simple in construction, and gives a performance suited to its class; i. e., that of a privately owned small plane where controllability and safety are most desirable. While the rotor shown is of the feathering type; i. e., the blades change their angle of incidence during each revolution, the main features of this invention are not limited to the use of that type of rotor but are equally useful for any type of rotor which is placed above the body.

The detail structure which is an important part of this invention will be more clearly understood by reference to Figs. 3 and 4 and 5, which show the frame as it would be made of tubing or other material. Tubes 20 and 21, Fig. 3, are the main longerons supporting the tail. Tubes 22 and 23 comprise an elevated longeron which is raised to allow it to pass over the door. Numeral 24 indicates the engine mount. The shear at the door is taken by tubular members 25 and 26. Above the door is a structure which serves both to brace the main structure and to mount the hub. The triangular frame 27 with apex aft is mounted on V members 28 and front legs 30. It is braced in shear and torsion by the diagonals 31 in the sides and 32 in front. This frame 27 is provided with a number of holes, studs or other forms of attachment 33, shown, for the hub 34. This whole structure is covered with cloth or metal or other sheet material to form a streamlined shape. The same useful combination of the cabin roof and hub mounting could be accomplished with sheet metal either in the wholly stressed skin or in the composite system of construction, the top ending in a triangular circle or other shape of a size small enough to attach directly to lugs on the hub (not shown). The appearance of this form of the invention would be similar to Figs. 1 and 2 and there would be no main structural members, merely skin stiffness and edging supports.

The landing gear in Figs. 1 and 2 is of the non-retractible type but this offers considerable resistance to the wind and therefore an alternative form is shown in Fig. 6, where the wheel 40 is journalled on axle 39, and the latter is rigidly attached to member 41, and links 42 and 43 are connected to the ends of 41 to the fuselage by pin joints. Shear is carried by member 44, which may be a cable, and in this case 45 is the counter cable. These cables may be led around pulleys 46 and 47 to a drum 48 on which cable is wrapped and prevented from slipping. Thus by turning drum 48 in one direction the shear cable 44 is loosened while counter 45 is tightened, pulling the wheel up and finally in close to the side of the fuselage, where it is shielded from the wind by the bulge of the fairing 50 on the side of the fuselage. This form of retractible gear is only one of the many different types all having the same characteristic of moving the wheel while in flight to a position where its resistance will be much lower or will even disappear. The use of means securing this general characteristic as applied to rotary wing aircraft is an object of this disclosure.

Another form of landing gear Fig. 7 is known as the cantilever type. It may or may not be retractible but is characterized by its structure. This structure consists of a single large sized member 36, which in this case is tapered and streamlined in section. This member 35 takes all the loads applied to the wheel in bending, torsion, or direct stress. The member 36 may be rigidly fastened to the body as shown or may be hinged on one edge and supported by springs and/or a shock absorber at the other edge but its form in either case is the same. Member 36 has the axle 39 fastened to its outer end and on this axle wheel 40 is mounted. The advantage of this type is a gear of low resistance and great simplicity and it is a new and useful feature in the design of rotary wing aircraft.

One of the difficulties in design of a small gyro is finding a space for the fuel tank which is near enough to the center of gravity and not in the way of the occupants or useful load which is also near the center of gravity. One solution of this is disclosed as a part of this invention. Referring to Fig. 4, 37 represents a fuel tank which is fitted into the structure which receives the hub on the top of the cabin. This location is not only out of the way and near the center of gravity, but makes it possible to have gravity force for the fuel.

Fig. 8 is a diagrammatic sketch of a gyro fuselage showing some of the various forces which are applied to it. Reference character 81 is a nosing overload on front wheel, character 82 the main landing gear reaction, character 83 the tail skid load, the thrust of the propeller is indicated at 84, the weight of the motor at 85, the resultant force applied by the rotor at slow speeds at 86, and the weight of the useful load at 87 and at 88 the rotor thrust at high speeds. All these and other forces are resisted by this new type of structure without the use of any pylon or other auxiliary structure.

We claim:

In rotary wing aircraft a rotor having a substantially vertical axis of rotation and capable of generating torsion and bending moments, a body structure simultaneously effecting both a cabin and a rotor mounting comprising substantially tubular pylon members comprising more than four triangular bracing assemblies each of which comprises three of said pylon members, and of which at least three of said pylon members of said multiplicity of bracing assemblies are braces in shear to preclude or absorb torsion and bending of the members of each assembly.

EDWARD BURKE WILFORD.
ADOLPH HERZOG.